United States Patent [19]
Kragl et al.

[11] Patent Number: 5,471,551
[45] Date of Patent: Nov. 28, 1995

[54] COMPONENT FOR USE IN THE TRANSMISSION OF OPTICAL SIGNALS

[75] Inventors: Hans Kragl, Ober-Ramstadt; Jens Weber, Kelkheim-Fischbach, both of Germany

[73] Assignee: Robert Bosch GmbH, Stuttgart, Germany

[21] Appl. No.: 256,212

[22] PCT Filed: Nov. 27, 1992

[86] PCT No.: PCT/DE92/00990

§ 371 Date: Jun. 23, 1994

§ 102(e) Date: Jun. 23, 1994

[87] PCT Pub. No.: WO/93/13440

PCT Pub. Date: Jul. 8, 1993

[30] Foreign Application Priority Data

Dec. 24, 1991 [DE] Germany ............... 41 42 922.2

[51] Int. Cl.⁶ ....................................... G02B 6/26
[52] U.S. Cl. ................................. 385/37; 385/30
[58] Field of Search ..................... 385/14, 15, 24, 385/27, 30, 32, 37

[56] References Cited

U.S. PATENT DOCUMENTS

| | | | |
|---|---|---|---|
| 4,729,111 | 3/1988 | Arrathoon et al. | 364/713 |
| 4,852,960 | 8/1989 | Alferness et al. | 385/37 |
| 5,016,967 | 5/1991 | Meltz et al. | 385/37 |
| 5,054,873 | 10/1991 | Davis et al. | 385/27 |
| 5,106,211 | 4/1992 | Chiang et al. | 385/132 |
| 5,218,651 | 6/1993 | Faco et al. | 385/4 |
| 5,233,187 | 8/1993 | Sakata et al. | 250/227.24 |
| 5,343,544 | 8/1994 | Boyd et al. | 385/46 |
| 5,351,324 | 9/1994 | Forman | 385/37 |
| 5,355,237 | 10/1994 | Lang et al. | 359/130 |

FOREIGN PATENT DOCUMENTS

| | | | |
|---|---|---|---|
| 0148266B1 | 7/1985 | European Pat. Off. | H04J 14/02 |
| 0226728A2 | 7/1987 | European Pat. Off. | G02B 5/28 |
| 0257531A2 | 3/1988 | European Pat. Off. | G02B 6/12 |
| 0308164A1 | 3/1989 | European Pat. Off. | G02B 6/34 |
| 3506569A1 | 8/1986 | Germany | G02B 6/12 |
| 4038654A1 | 6/1991 | Germany | G02F 1/335 |

OTHER PUBLICATIONS

H. A. Haus, "Narrow–Band Optical Channel–Dropping Filter", *IEEE Journal of Lightwave Technology*, vol. 10, No. 1, Jan. 1992, pp. 57–62.

C. H. Henry et al., "Glass Waveguides on Silicon for Hybrid Optical Packaging", *Journal of Lightwave Technology*, vol. 7, No. 10, Oct. 1989, pp. 1530–1539.

*Primary Examiner*—Rodney B. Bovernick
*Assistant Examiner*—Robert E. Wise
*Attorney, Agent, or Firm*—Kenyon & Kenyon

[57] ABSTRACT

A component to be used for the frequency-selective modulation and/or for the frequency-selective receiving and demodulation of frequency-division multiplexed optical signals. The component of the present invention includes a waveguide, to which multiplexed optical signals are applied, and at least one further waveguide, running substantially parallel to the waveguide and which is evanescently coupled to the waveguide. The at least one further waveguide is designed as a Bragg resonator, by means of a structuring in the longitudinal direction, and the component further includes at least one semiconductor diode, which is optically coupled to the Bragg resonator.

18 Claims, 6 Drawing Sheets

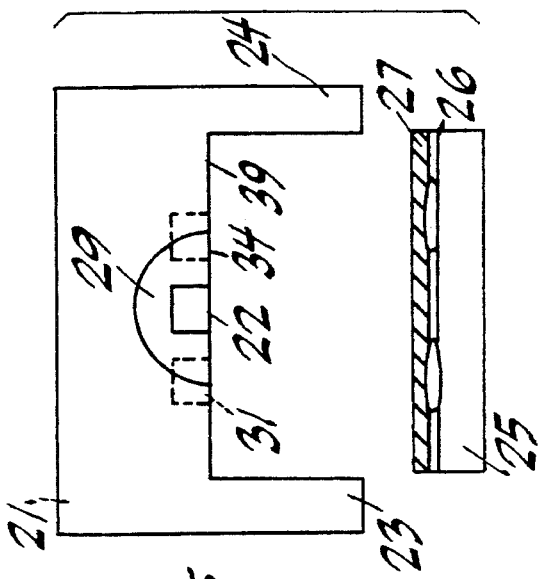
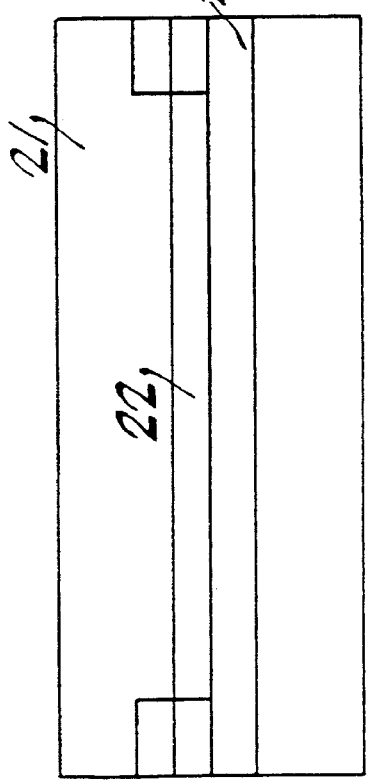
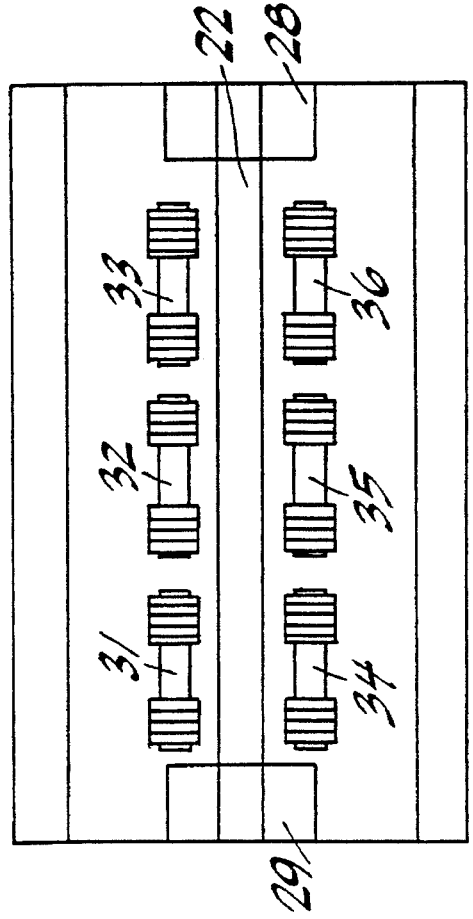
FIG. 2C
FIG. 2A
FIG. 2B

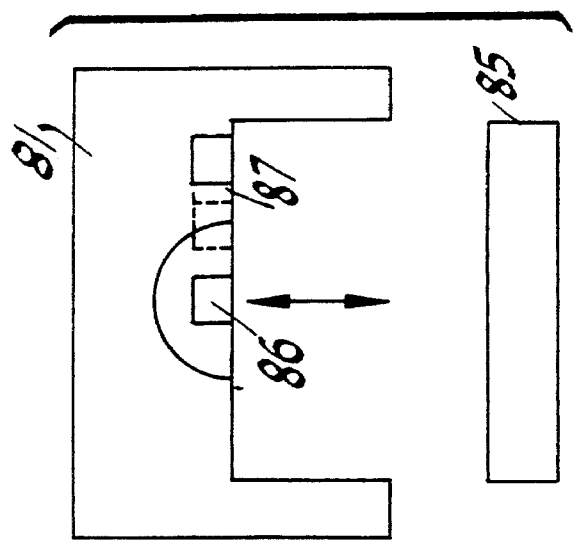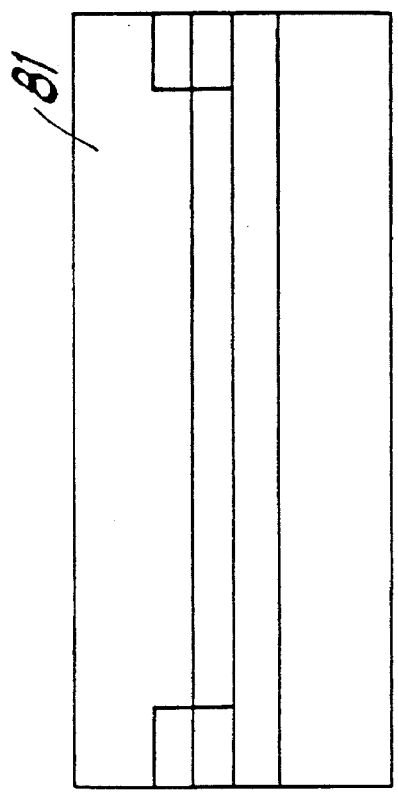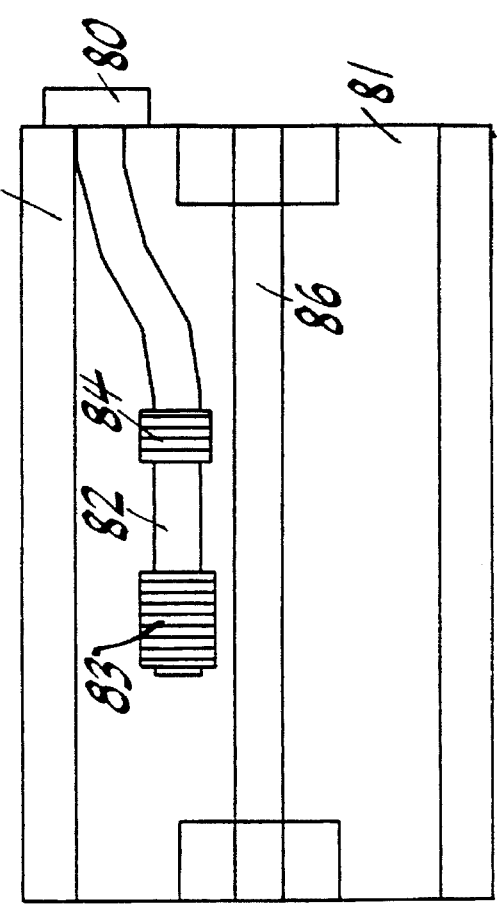

5,471,551

COMPONENT FOR USE IN THE TRANSMISSION OF OPTICAL SIGNALS

FIELD OF THE INVENTION

The present invention relates to a component for use in optical signal transmission. More specifically, the present invention relates to a component for use in the frequency-selective modulation and/or the frequency-selective receiving and demodulation of frequency-division multiplexed optical signals.

BACKGROUND OF THE INVENTION

In optical transmission systems, a frequency-division multiplexing method is used, inter alia, to allow multiple utilization of a glass fiber, according to which method, light of varying wavelengths, or rather frequencies, is conducted by a glass fiber. Frequency-division multiplexing systems require a device at the transmitter end to produce and modulate the various carriers, and a device at the receiver end to separate and demodulate the various channels. In principle, it is especially cost-effective to realize suitable devices as integrated optical components, when a large-scale production is possible.

In the case of one such known component as described in German Published Patent Application No. 35 06 569 A1, the light received by many channels, which are close together in terms of frequency, is distributed through coupling resonators, and then selectively coupled according to frequency into the so-called useful resonators, so that only the light of one single transmission channel appears in each useful resonator. In the case of this known device, all the resonators are of the Fabry-Perot type. Situated in the spatial proximity of a useful resonator is a photodiode, which is poled in the blocking direction and which serves to detect the channel, given a properly selected energy gap in the material of the useful resonator. Silicon or silicon/germanium alloys are proposed as suitable materials, which, when properly dimensioned, allow both waveguide structures as well as photodiodes to be produced.

Manufacturing this known arrangement entails a complex technology of epitactically growing very thick layers of silicon or silicon/germanium alloys, since the matrix resonator has a spatial, three-dimensional structure.

SUMMARY OF THE INVENTION

An object of the present invention is to specify a component to be used in the transmission of optical signals according to the frequency-division multiplexing method, which component can be inexpensively produced with the simplest possible technologies.

The component according to the present invention is suited both as a transmitter-end, frequency-selective modulator, as well as a frequency-selective receiver and demodulator. Thus, with one single component, the frequency selection, the demodulation, or rather modulation are rendered possible.

When used as receivers, the semiconductor diodes are operated as optoelectric receivers, the signals produced by the semiconductor diodes being amplified and further processed in a generally known way. When the component according to the present invention is operated as a modulator, the modulation signals are fed to the semiconductor diodes in the conducting state region, so that the resonant frequency of the Bragg resonator is modified and, at the same time, the attenuation in the Bragg resonator is influenced. In this manner, the optical output signal is controlled by the modulation signal. Moreover, a modulation can take place by modifying the refractive index using the electro-optical effect in the area of the resonator, when the component is made of a material suited for this purpose.

BRIEF DESCRIPTION OF THE DRAWINGS

FIG. 2 shows several views of a first exemplified embodiment of a component in accordance with the present invention.

FIG. 8 shows several views of a fifth exemplified embodiment of a component in accordance with the present invention.

DETAILED DESCRIPTION

The same parts are given the same reference symbols in the Figures. In the following, that waveguide, which conducts the optical signals to be received when the component according to the invention is used as a receiver, and which conducts the optical signals to be transmitted when the component is used as a frequency-selective modulator, is described as the central waveguide to distinguish it from the other waveguides.

Figure 1:
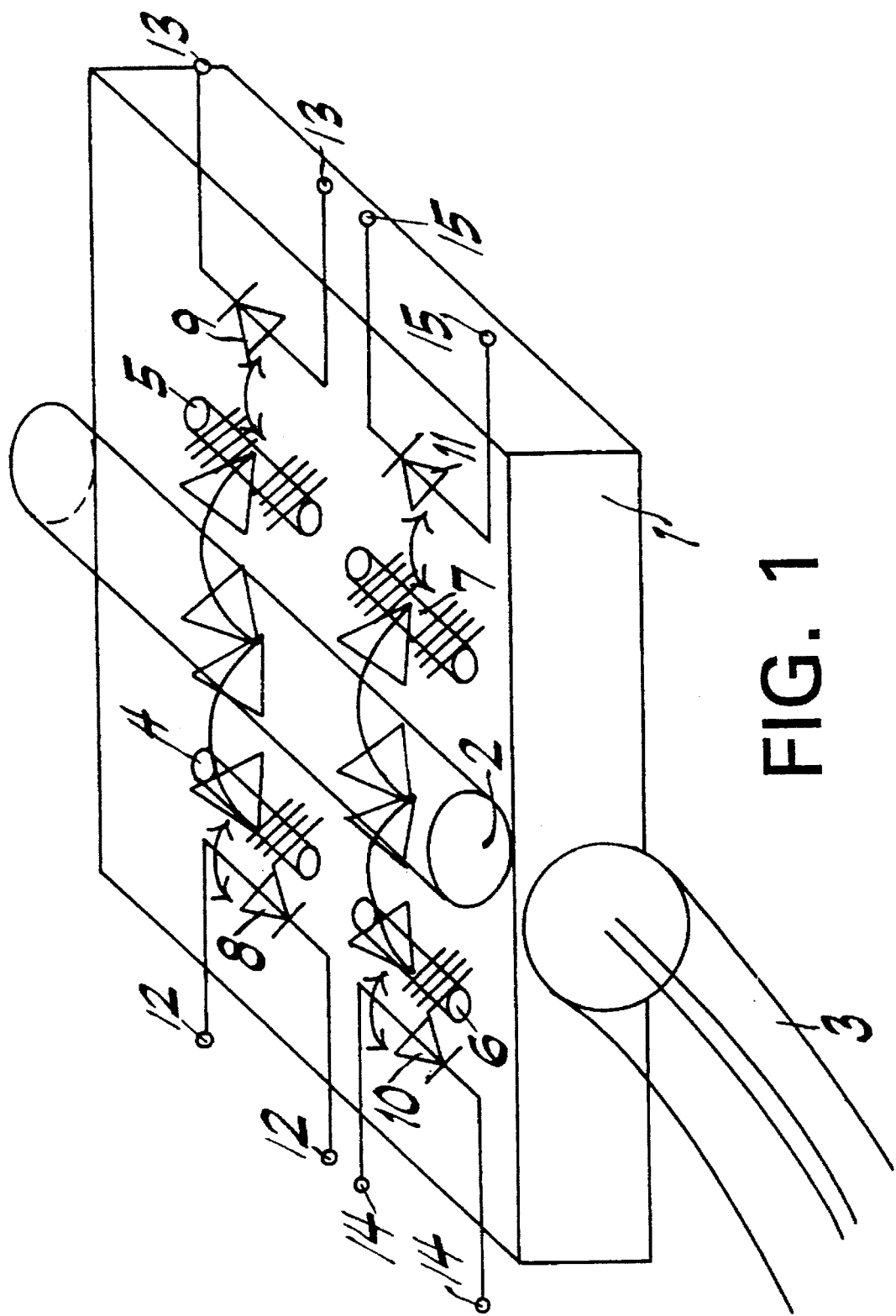
FIG. 1 is a schematic representation of a component in accordance with the present invention.

In the case of the schematically depicted component in FIG. 1, a central waveguide 2, to which a glass fiber 3 can be coupled at least at one end, is situated on a supporting material 1 (substrate). Of the components according to the present invention, several can be arranged one behind the other, the light to be received or rather transmitted passing one after the other through the central waveguides 2 of several components.

Other waveguides 4, 5, 6, 7, which extend essentially parallel to the central waveguide 2, are evanescently coupled to the central waveguide 2, as indicated by the bold double arrows in FIG. 1. The additional waveguides 4 through 7 are structured in the longitudinal direction by altering the effective refractive index, so as to allow them to form Bragg resonators. This type of coupling of Bragg resonators had already been proposed in U.S. Pat. No. 4,852,960 as a component of a laser system. This coupling is able to be realized with comparatively little technological complexity using the so-called HOPS technology, which is described, for example, in C. H. Henry et al., "Glass Waveguides on Silicon for Hybrid Optical Packaging" *IEEE Journal of Lightwave Technology*, vol. 7, no. 10, October 1989, pp. 1530–1539. Thus, a narrow-enough frequency selection is able to be achieved for separating several frequency-division multiplexing channels. Another technology for manufacturing the component according to the present invention will be clarified in greater detail further on in connection with FIGS. 2 through 7.

Surface diodes 8, 9, 10, 11, which can be operated, depending on the designated purpose of the component, in the blocking or conducting direction, are arranged on the supporting material 1 below or to the side of each Bragg resonator. These diodes are arranged near the waveguides, so as to allow the optical field to be coupled, on the one hand, into the diode at the desired locations (small double arrows) and, on the other hand, so as to ensure that the wave guidance of the other waveguides or rather Bragg resonators is not prevented by too high an attenuation. If the semiconductor diodes 8 through 11 are optically coupled to the respective Bragg resonator, so as to ensure in this manner that the resonators are not too heavily damped so that a narrow resonance curve can be achieved, but also to ensure that a light intensity that suffices for detecting light attains the p-n junction of the semiconductor diode, a component is formed, which selects and demodulates the received optical signals according to their frequency. The received electrical signals can then be tapped at the connections 12 through 15.

In place of the integrated, optical central waveguide 2, a groove situated on the integrated optical structure can be used to accommodate the fiber, in which groove a glass fiber that has been released from the jacket is inserted, if desired, in connection with index oil. In some instances, the fiber groove can be curved, so as to ensure a strong enough coupling to the Bragg resonators. In this specific embodiment, the light guided in the glass fiber is directly coupled to the Bragg resonators and does not need to be introduced via a transition point into the central waveguide 2.

In another specific embodiment, which is not shown in the drawing, the central waveguide is push-coupled to a laser medium, which is as non-reflecting as possible and has the most inhomogeneous possible laser line. If light having the resonant frequency of a Bragg resonator is coupled into the component, it is reflected, whereupon this frequency shows build-up of oscillation in the laser oscillator. Since it is possible to tune the resonant frequency in the Bragg resonators with the help of the underlying diodes or, in another manner, by modifying the refractive index, many laser lines can be independently modulated in this manner.

The exemplified embodiment of the present invention, which is shown broken down into various parts in FIG. 2, serves essentially as a receiver component in a frequency-division multiplexing system, which works with direct detection. A groove 22 is provided in a member 21 of low-refractive polymer, which is referred to as a component frame in the following. The groove 22 serves to accommodate the central waveguide, as will be clarified later on on the basis of FIG. 3. On its sides, the component frame 21 has strip-shaped mounting supports 23, 24, between which a semiconductor substrate 25 can be introduced. This substrate supports the semiconductor diodes and is provided with a semi-conducting layer 26, which consists of aluminum, for example. Above the semiconducting layer 26 is found another layer 27 of polymer, or rather of silicon dioxide. The groove 22 is widened in the end regions 28, 29 to accommodate one end of one jacketed glass fiber each. Other grooves 31 through 36, which are structured as Bragg resonators, are formed parallel to the groove 22 in the member 21.

Figure 3:
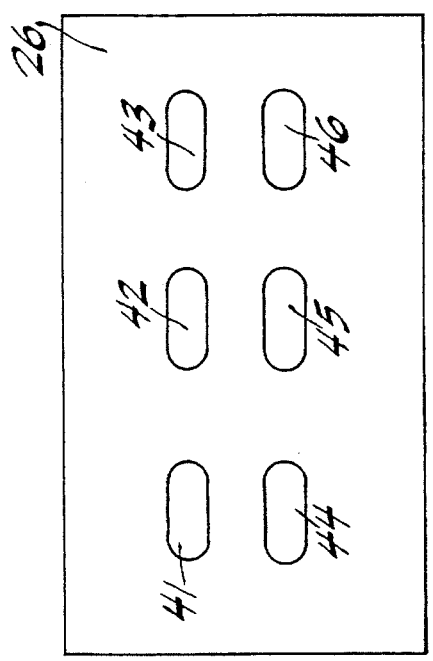
FIG. 3 shows a semiconducting layer of the component of FIG. 2.

The exemplified embodiment depicted in FIG. 3 is manufactured in that as waveguides, the groove 22 and the other grooves are filled with a liquid polymer adhesive agent having a higher refractive index and that, subsequently, the substrate plate is pressed on to the surface 39 (FIG. 2) of the component frame surrounding the groove 22 and the other grooves 31 through 36. The layer 30, which is formed from liquid polymer that is situated next to the groove 22, should have a smallest possible thickness δ, when it is not able be completely squeezed out. To this end, a high enough pressure must be applied when the substrate 25 is pressed in.

Figure 4:
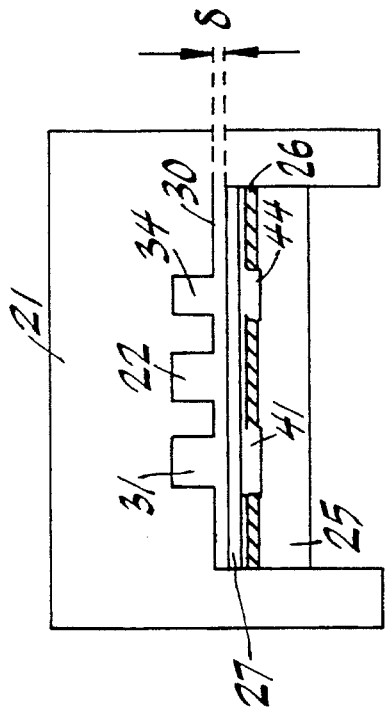
FIG. 4 shows a cross-section of the component of FIGS. 2 and 3.

The semi-conducting layer 26 situated on the semiconductor substrate 25 is depicted as a top view in FIG. 3. Each of the openings 41 through 46 is situated below one of the Bragg resonators located in the grooves 31 through 36. A semiconductor diode is provided on the surface of the substrate 25 below each opening 41 through 46. FIG. 4 depicts a cross-section through the exemplified embodiment already described in connection with FIGS. 2 and 3.

When the semi-conducting layer 26 is applied to the semiconductor supporting material 25 (substrate) bearing the p-n junctions, care should be taken not to disturb the electrical configuration. This can be achieved by introducing a thin, insulating intermediate layer, or through the skillful application of the semi-conducting layer as a contact.

To enlarge the absorption zone of the light in the p-n junctions, the p-n zones can be designed as pin diodes—thus with an intrinsic intermediate layer.

Figure 5:
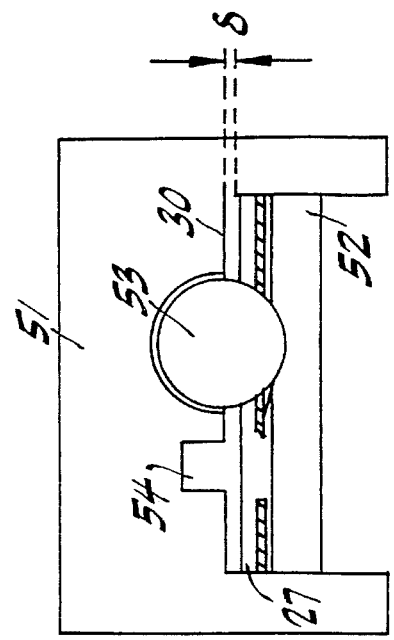
FIG. 5 shows a cross-section of a second exemplified embodiment of a component in accordance with the present invention.

Also, when realizing the component according to the present invention, the component frame can help to provide a groove suited for introducing a glass fiber, as depicted in FIG. 5. By properly shaping the component frame 51 and, in some instances, the semiconductor supporting material 52, a channel is formed with a circular cross-section for a glass fiber 53. The groove 54 for the Bragg resonators, as well as the further structure of the semiconductor supporting material correspond to the parts shown in FIG. 2. However, in this exemplified embodiment, only one groove 54 is provided for Bragg resonators.

Figure 6C:
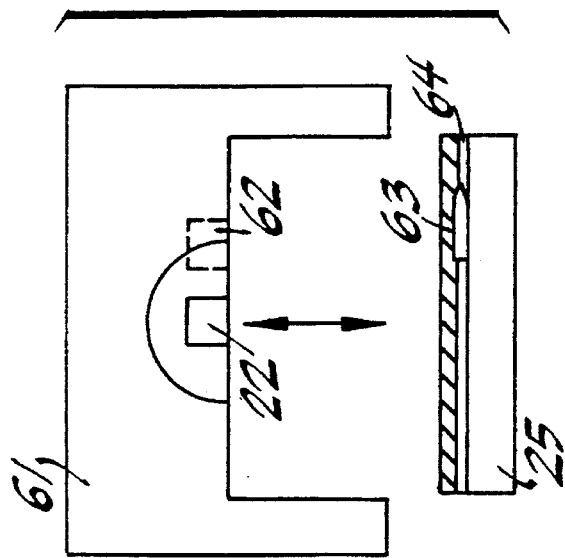
FIG. 6 shows several views of a third exemplified embodiment of a component in accordance with the present invention.
Figure 6A:
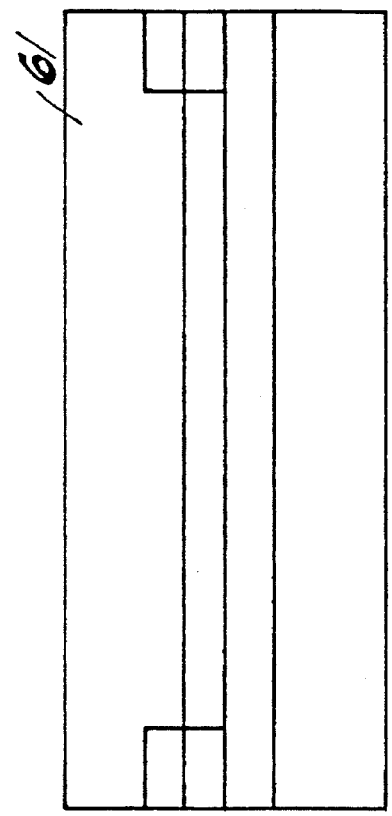
Figure 6B:
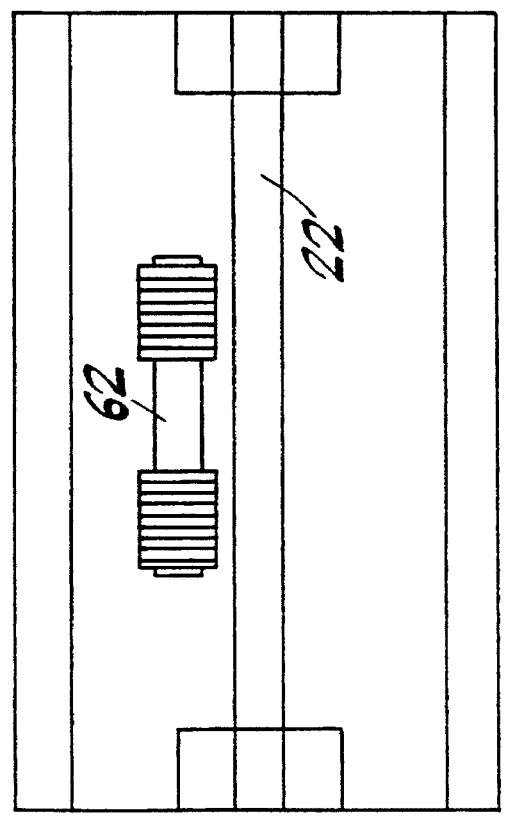

FIG. 6 depicts a component having only one Bragg resonator 62 in the member 61, opposite which is only one opening 63 of a semi-conducting layer 64. The other parts of the arrangement according to FIG. 6 are comparable to those of FIG. 2.

Figure 7C:
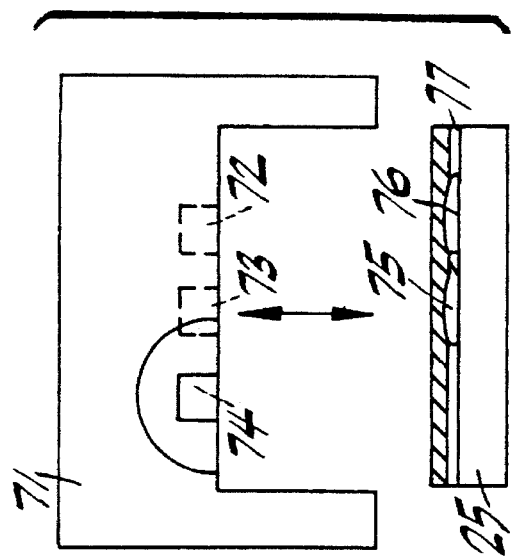
FIG. 7 shows several views of a fourth exemplified embodiment of a component in accordance with the present invention.
Figure 7A:
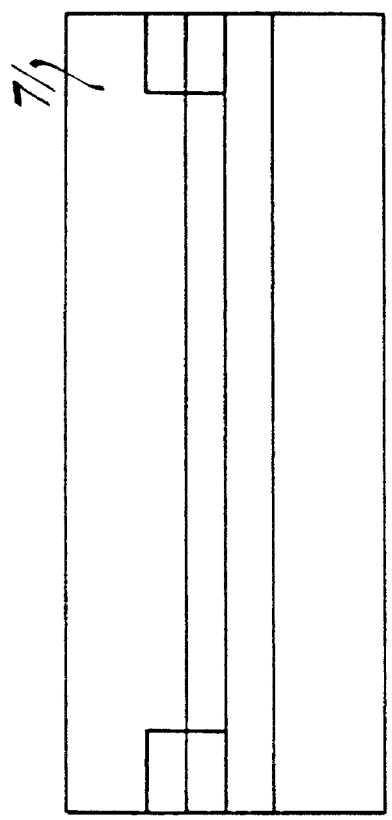
Figure 7B:
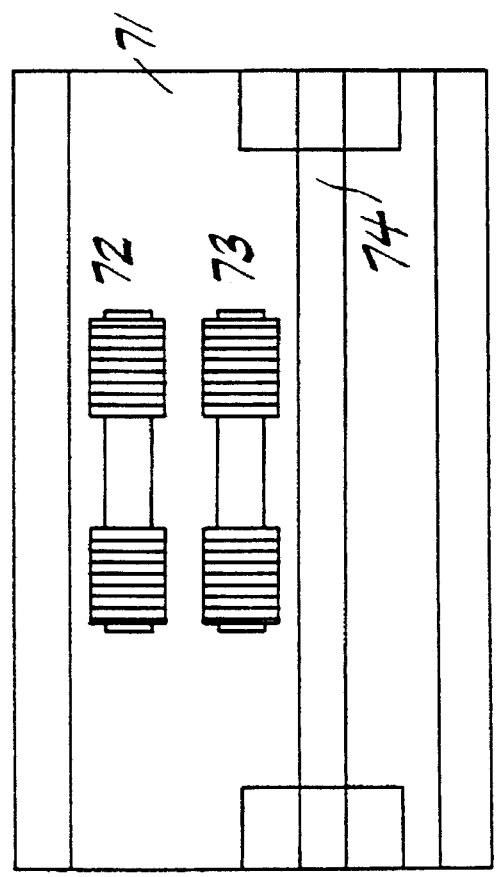

In another exemplified embodiment according to FIG. 7, two Bragg resonators 72, 73 are arranged in parallel in the member 71 on one side of the groove 74 representing the central waveguide. Corresponding cutouts 75, 76 are provided in the semi-conducting layer 77.

FIG. 8 depicts an example of the coupling of an optoelectric receiver 80 to a front end of a Bragg resonator 82. The structures are each arranged in an end region 83 of the Bragg resonator, so as to allow a complete reflection to result, while a partial transmittance exists in the end region 84. In place of the semiconductor supporting material in the other specific embodiments, in the case of the specific embodiment according to FIG. 8, a plate 85 of low-refractive polymer can be used, so that the central waveguide formed by the groove 86, the Bragg resonator 82, and the waveguide 87 between the Bragg resonator 82 and the optoelectric receiver 80 are sealed to the bottom. The optoelectric receiver 80 can be secured, for example, by adhesive to the member 81.

Several possibilities exist for using the component in the transmitting device. First of all, an unmodulated frequency comb, which had been produced with the help of another device, can be coupled into the component according to the present invention. The modulation is achieved by detuning the individual Bragg resonators in that the refractive index is modified in the substrate diodes by changing the conducting-state current. Furthermore, the component according to the present invention can be used in place of a laser mirror in a laser oscillator having a sufficiently inhomogeneous laser medium. Those frequencies, which correspond to the resonant frequencies of the Bragg resonators, then build up oscillation in the oscillator. The modulation also follows in this case by detuning the resonant frequency. The resonant frequencies can then be roughly tuned by varying the temperature—thus by heating or, possibly also, by cooling.

What is claimed is:

1. A component for use in transmitting frequency-division multiplexed optical signals, comprising:

a first waveguide, which is capable of being supplied with the multiplexed optical signals;

at least one further waveguide, running substantially parallel to the first waveguide, being evanescently coupled to the first waveguide, and being structured in the longitudinal direction as a Bragg resonator; and at least one semiconductor diode optically coupled directly to the at least one Bragg resonator.

2. The component according to claim 1, comprising at least two further waveguides structured as Bragg resonators, with at least one further waveguide arranged on a first side of the first waveguide and at least one other further waveguide arranged on a second side of the first waveguide.

3. The component according to claim 1, wherein the first waveguide is arranged on a supporting material.

4. The component according to claim 1, wherein the at least one semiconductor diode is arranged near a longitudinal side of the at least one further waveguide.

5. The component according to claim 1, wherein the at least one semiconductor diode is coupled to a front end of the at least one further waveguide.

6. The component according to claim 1, wherein the at least one semiconductor diode is an evanescently coupled diode.

7. The component according to claim 1, wherein the first waveguide is composed of a glass fiber, which guides the optical signals and is inserted in a channel in the component.

8. The component according to claim 7, wherein the channel is curved.

9. The component according to claim 1, further comprising:

a member of low-refractive material, preferably a polymer, with a first groove for accommodating the first waveguide and at least one further groove running at least partially parallel to the first groove for accommodating the at least one further waveguide, the first and further grooves being formed into a lower surface of the member of low-refractive material; and a substrate plate which bears the at least one semiconductor diode;

wherein:

the at least one further groove of the member of low-refractive material includes gratings for the Bragg resonator;

the member of low-refractive material is coupled to the substrate plate at the lower surface;

a metal layer is arranged on the surface of the substrate plate facing the member of low-refractive material, which metal layer is provided at least partially with openings in a vicinity of the at least one further groove; and the at least one semiconductor diode is formed in the substrate plate in the area of the openings in the metal layer.

10. The component according to claim 9, wherein the member of low-refractive material includes strip-shaped mounting supports for the substrate plate at at least two sides of the surface surrounding the first and further groove.

11. The component according to claim 9, wherein the first and further groove have a rectangular cross-section.

12. The component according to claim 9, wherein the first and further waveguides include a polymer that is more refractive than the member of low-refractive material.

13. The component according to claim 1, further comprising:

a member of low-refractive material, preferably a polymer, with a first groove for accommodating the first waveguide, and at least one further groove running at least partially parallel with the first groove, for accommodating the at least one further waveguide, the first and further grooves being formed into a lower surface of the member of low-refractive material; and a plate of low-refractive material;

wherein:

the member of low-refractive material is coupled to the plate of low-refractive material at the lower surface;

the at least one further groove is partially structured with gratings for the Bragg resonator and is elongated beyond the Bragg resonator up to an edge of the member of low-refractive material; and an optoelectric receiver is arranged at the end of the elongated further groove.

14. The component according to claim 13, wherein the member of low-refractive material has strip-shaped mounting supports of low-refractive material for the plate at at least two sides of the surface surrounding the first and further grooves.

15. The component according to claim 14, wherein the first and further waveguides include a polymer that is more refractive than the member of low-refractive material.

16. The component according to claim 13, wherein the first and further groove have a rectangular cross-section.

17. The component according to claim 1, comprising at least two further waveguides structured as Bragg resonators, the at least two further waveguides being arranged one behind the other, as viewed in a longitudinal direction of the waveguides.

18. The component according to claim 1, comprising at least two further waveguides structured as Bragg resonators, the at least two further waveguides being arranged side-by-side, as viewed in a longitudinal direction of the waveguides.

* * * * *